UNITED STATES PATENT OFFICE.

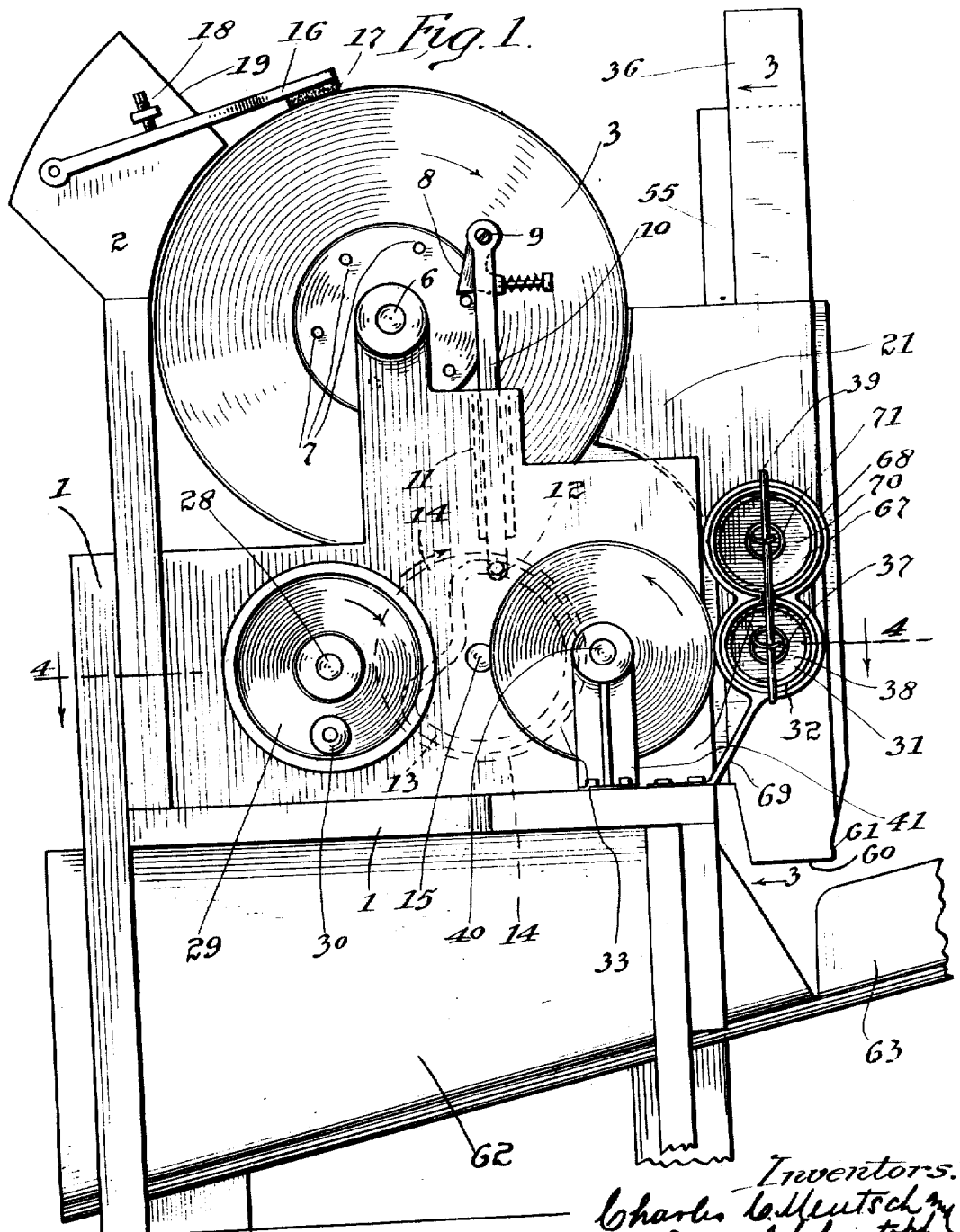

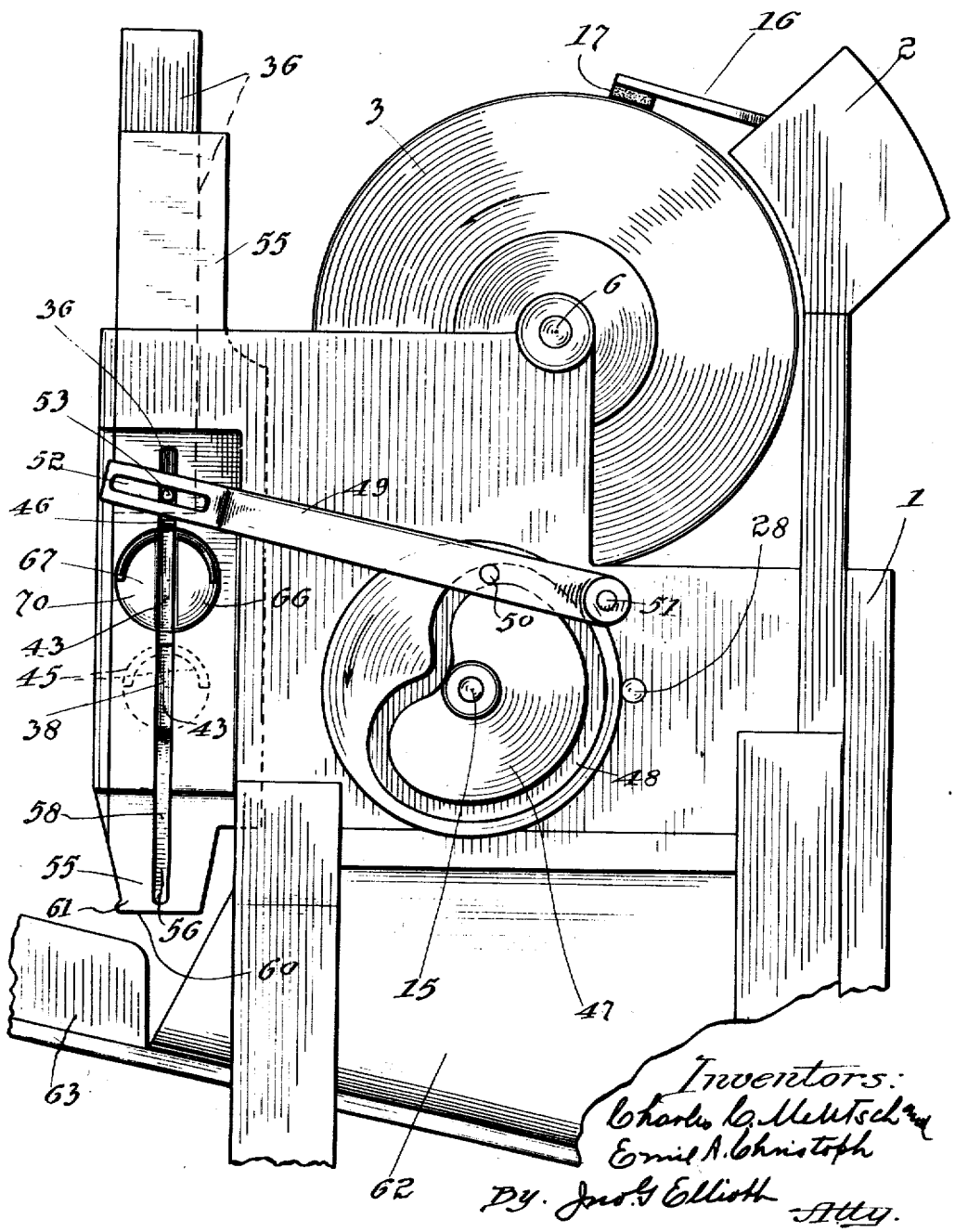

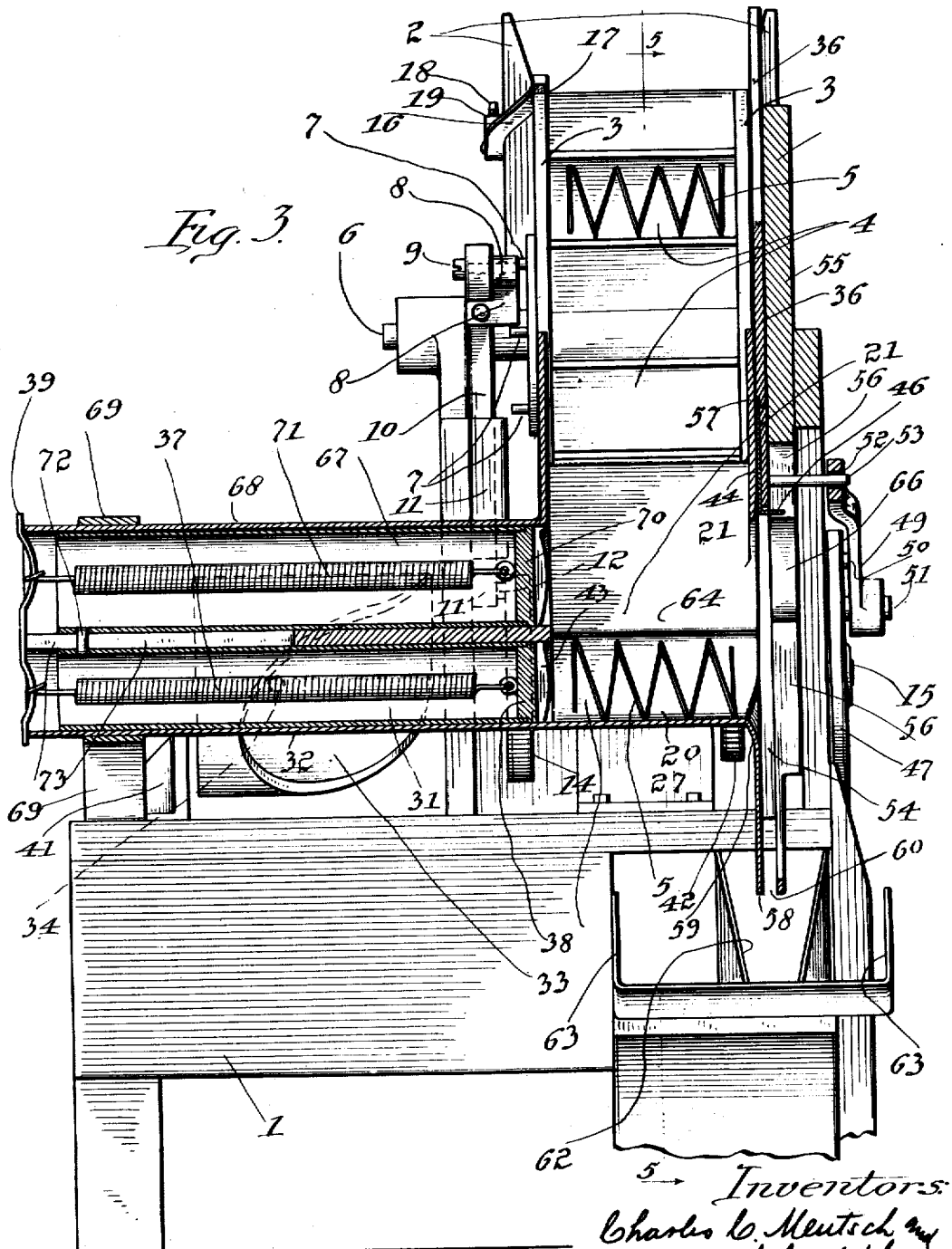

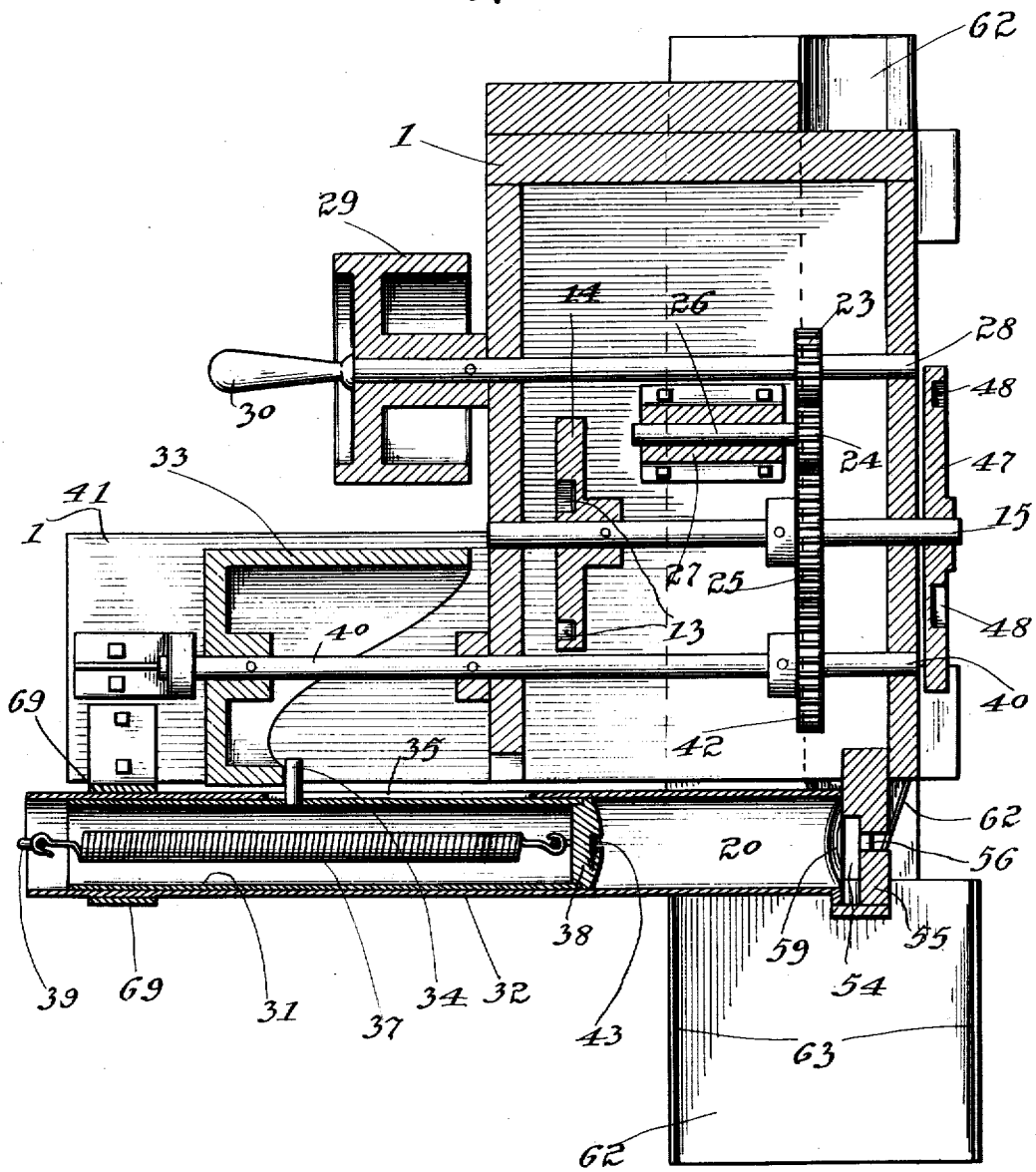

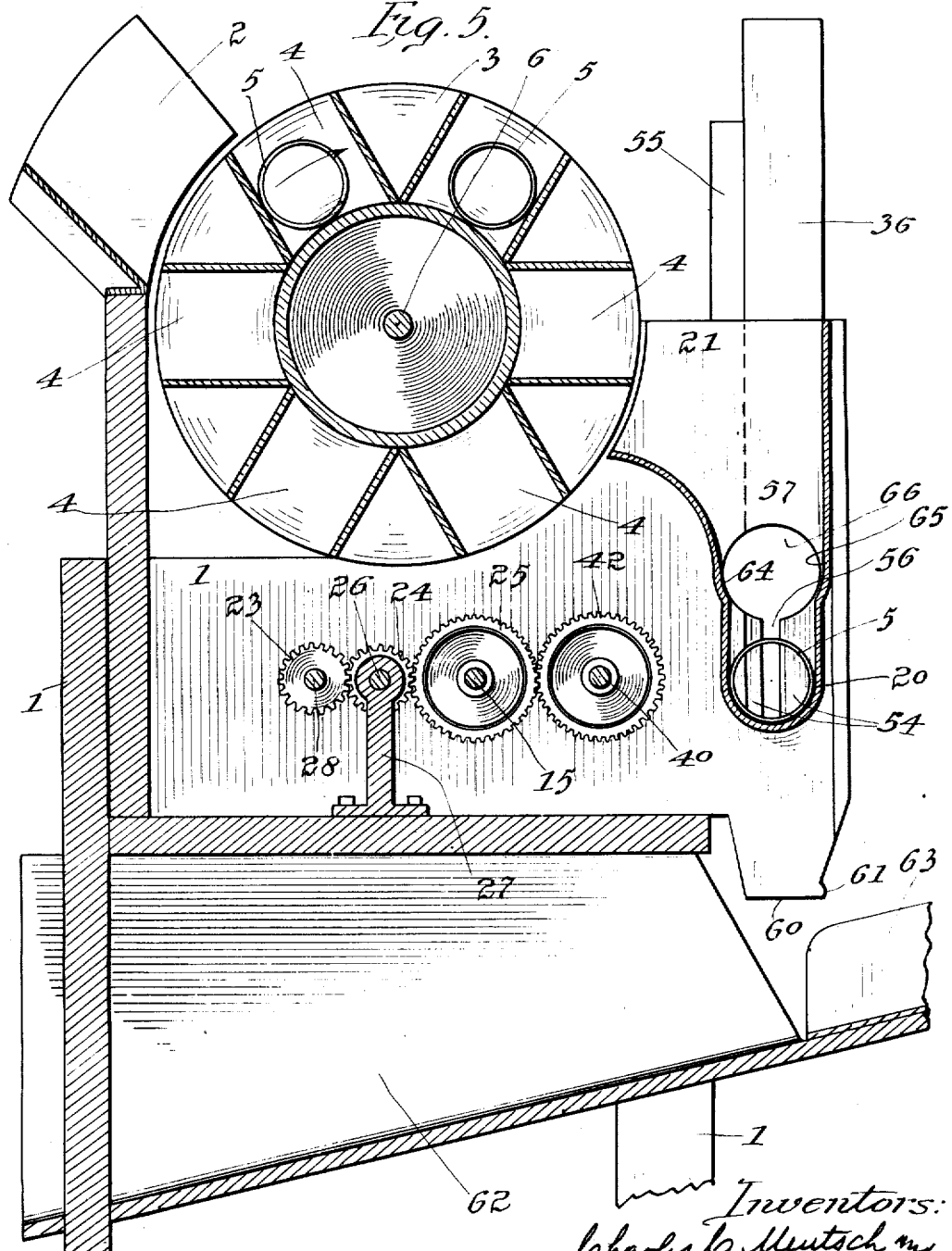

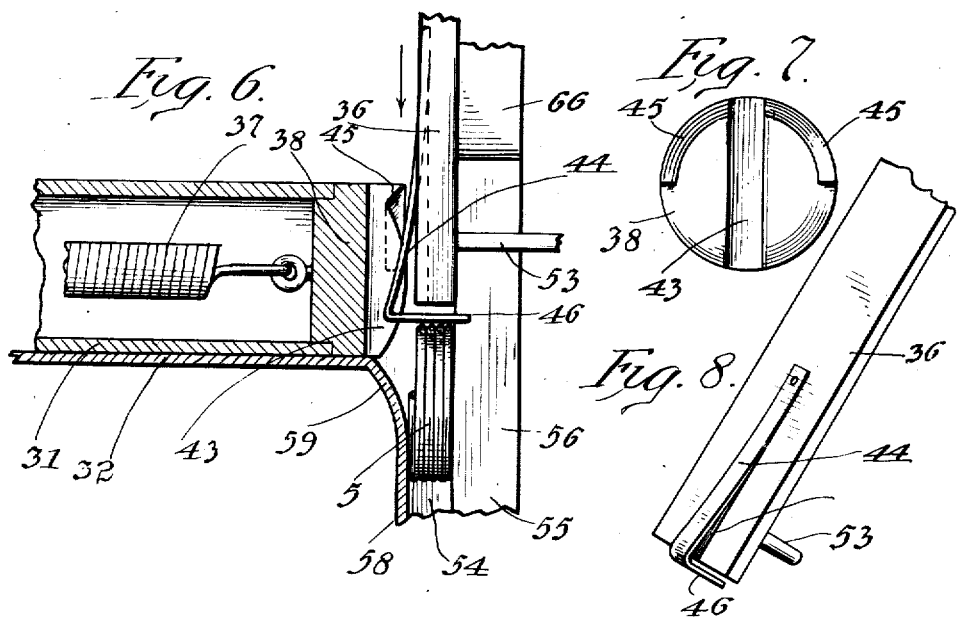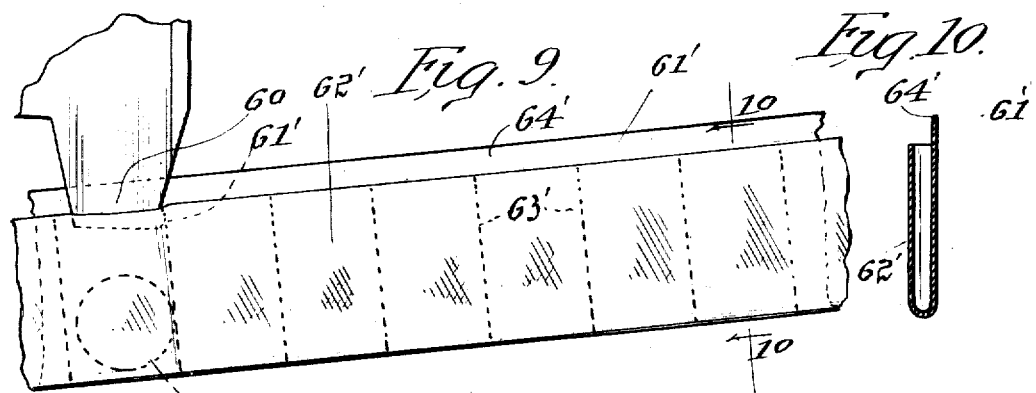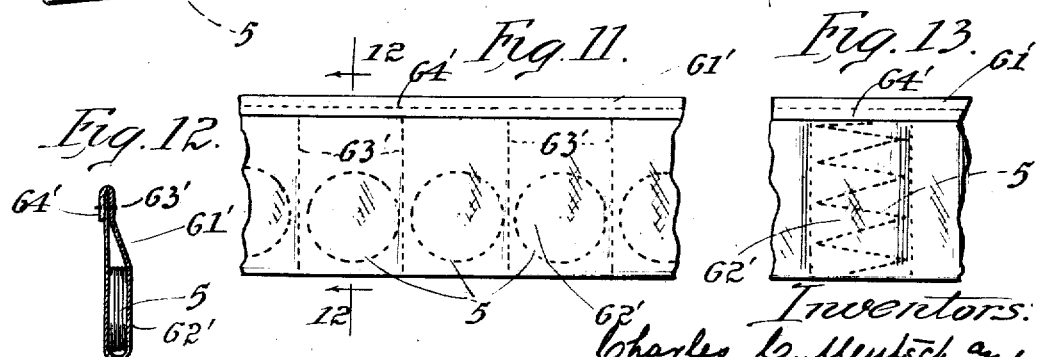

CHARLES C. MEUTSCH, OF CHICAGO, ILLINOIS, AND EMIL A. CHRISTOPH, OF BUFFALO, NEW YORK.

CUSHION-SPRING-ASSEMBLING MACHINE.

1,348,654.  Specification of Letters Patent.  Patented Aug. 3, 1920.

Application filed November 10, 1919. Serial No. 337,010.

*To all whom it may concern:*

Be it known that we, CHARLES C. MEUTSCH and EMIL A. CHRISTOPH, citizens of the United States, and residents, respectively, of the cities of Chicago and Buffalo, in the counties of Cook and Erie and States of Illinois and New York, have invented certain new and useful Improvements in Cushion-Spring-Assembling Machines, of which the following is a full, clear, and exact specification.

This invention relates to spring assembling machines for inserting coiled springs in pockets interiorly located in upholstered constructions for cushions, pillows, mattresses, etc.

The prime object of this invention broadly stated, is to provide a spring assembling machine with means adapted for successively compressing and forcing coiled springs in the compressed condition into pockets formed in folded strips of fabric during the passage of the strips through the machine.

A further object of this invention is to intermittently feed coiled springs into a compressor and force them in a compressed condition into fabric pockets.

A still further object of this invention is to successively compress coiled springs and force them in a compressed condition into pockets adapted to temporarily maintain the springs against expansion therein.

Another object is to successively compress coiled springs in an axial direction and subsequently force them in a direction perpendicular to their axes into pockets formed in strips, whereby each spring will have a limited expansion transversely of its receiving pocket.

Another object is to introduce compressed coiled springs into individual pockets therefor formed in fabric strips.

Another object is to successively compress coiled springs in an axial direction and direct them during their compressed condition, perpendicularly to their axes into pockets formed in strips and in which the compressed springs will have a limited expansion transversely of the receiving pockets.

Another object is to introduce compressed coiled springs into pockets formed in a longitudinally folded strip the walls of which pocket are adapted to hold the springs against full expansion until the pocket is sewed up and the springs are turned therein at 90 degrees.

A further object is to provide an assembling machine with means for automatically ejecting springs too large for the receiving pockets. Other objects will appear hereinafter.

With these objects in view, our invention finds embodiment in certain features of novelty in the construction, combination and arrangement of parts by which the said objects are attained, all as hereinafter fully described with reference to the accompanying drawings and more particularly pointed out in the claims.

In said drawings,—

Figure 1 is an elevation showing one side of the machine in which my invention finds its embodiment.

Fig. 2 is an elevation showing the other side of the machine.

Fig. 3 is a front elevation of the machine, parts being shown in a section taken on line 3—3 of Fig. 1.

Fig. 4 is a plan section taken through the machine on line 4—4 of Fig. 1.

Fig. 5 is a vertical longitudinal section of the machine on line 5—5 of Fig. 3.

Fig. 6 is an enlarged detail section showing the coöperation of a compressing plunger and an ejecting slide employed in the machine.

Fig. 7 is an end elevation of said plunger,

Fig. 8 is a perspective view of said slide,

Fig. 9 is an enlarged elevation showing the manner of placing pockets to receive coil-springs from the machine.

Fig. 10 is a transverse section taken through a pocket on line 10—10 of Fig. 9.

Fig. 11 is an elevation showing the appearance of a pocket strip filled with springs and with the pocket openings sewed up.

Fig. 12 is a transverse section taken through said pocket strip on line 12—12 of Fig. 11, showing a contained spring with the axis thereof transversely of the pocket for resisting expansion; and, Fig. 13 is an elevation showing a portion of a pocket strip after the springs contained therein have been turned for full expansion.

The preferred form of construction, as shown in the drawings, comprises a frame 1 and a hopper 2 supported thereby for receiving coil-springs from an automatic machine (not shown).

An intermittent wheel 3, having pockets 4, for the reception of the coil-springs 5, is mounted on a transversely extending shaft 6, which is journaled in frame 1, as shown in Figs. 1 and 5.

The mechanism for actuating and controlling intermittent wheel 3 comprises a plurality of laterally projecting pins 7, which coöperate with a spring-pressed pawl 8 pivoted on a screw 9 at the upper end of a cam-operated slide 10 mounted for free movement in a casing 11, which projects inwardly from frame 1, as shown in Fig. 3. The lower end of slide 10 is provided with a cam-roll 12 which projects into a cam path 13 of a box-cam 14 carried by a cam-shaft 15, which is arranged parallel to shaft 6, as shown in Fig. 1.

In the operation of the intermittent wheel 3, slide 10 is depressed at the proper time by the action of cam-roll 12 in the cam-path 13 of box-cam 14, the direction of movement of the latter being indicated in Fig. 1. During the downward movement of slide 10, intermittent wheel 3 is moved a sixth of a revolution by means of pawl 8, which acts on a pin 7, as clearly shown in Fig. 1. At the limit of such movement of intermittent wheel 3, it becomes necessary to effect a sudden stop, and to this end a pressure arm 16 having a friction pad 17 is provided to act on the periphery of said wheel 3. Arm 16 is pivoted on one side of hopper 2, and the pressure of pad 17 is controlled by a set-screw 18 mounted in a lug 19, which projects from said hopper.

The position of intermittent wheel 3, as shown in Fig. 5, does not correspond with the other views in that the same is shown in motion, or in a medial position between stops, it being obvious that a pocket 4 should register with the hopper 2 for receiving a spring when said wheel is stationary. In Fig. 5, two springs 5 are shown moving in intermittent wheel 3, and also a third spring which has rolled out of a pocket 4 into a pocket 20 provided at the lower end of a compressor hopper 21, to be described hereinafter.

Shaft 15, which carries box-cam 14 for actuating intermittent wheel 3, receives its motion from a drive shaft through the medium of spur gears 23, 24 and 25, the latter being secured to shaft 15, as shown in Fig. 4. Gear 24 is an idler and is carried by a shaft 26 journaled in a bearing 27 projecting upwardly from frame 1, as shown in Fig. 5. Gear 23, meshing with gear 24, is carried by the drive shaft 28 arranged parallel to shafts 6 and 15, said shaft 28 being provided at one end thereof with a pulley 29 and a handle 30 projecting therefrom, to permit of manual operation of the machine.

After a spring 5 has been discharged from intermittent wheel 3 into pocket 20 of the compressor hopper 21, said spring is compressed endwise by means of a compressor plunger 31 mounted to reciprocate in a horizontal cylinder 32, which is arranged in alinement with said pocket, as shown in Fig. 3. Said plunger is actuated at the proper time by means of a single-acting cam 33 through the medium of a pin 34 projecting rearwardly from plunger 31, as shown in Fig. 4, a slot 35 being formed in the wall of cylinder 32 to provide clearance for said pin. The contour of cam 33 is such as to hold a spring 5 in compressed condition an interval of sufficient duration to permit an ejecting slide 36 to act on the compressed spring for forcing the same downward, as shown in Fig. 6. The return movement of plunger 31 is effected by means of an elongated tension helical spring 37, which is fastened at one end to the plunger head 38 and at the other end to a diametric vertically extending rod 39 held in position at the open end of cylinder 32 by the tension of said spring.

The compressor cam 33 is mounted on a shaft 40 arranged parallel to the other shafts and journaled in frame 1 and a bearing bracket 41, said shaft carrying a driven spur gear 42 meshing with and driven by spur gear 25.

The face of plunger head 38 is convex in form and provided with a vertical diametric groove 43 to provide clearance for the free flexing of a contact spring 44 carried by ejecting slide 36, as shown in Fig. 6. Said head is also provided with segmental flanges 45 arranged at the upper edge thereof for preventing a spring 5, when engaged by said head, from flying upward into hopper 21. The function of a horizontally extending contact portion 46 of contact spring 44 is to bridge over the path of ejecting slide 36 to insure contact with all of the turns of a spring 5 and to preclude the possibility of sticking of said last named ring between plunger head 38 and said ejecting slide during the downward movement thereof, as clearly illustrated in Fig. 6.

The mechanism for actuating and controlling ejecting slide 35 comprises a box-cam 47 carried at one end of cam shaft 15 and provided with a cam groove 48, as shown in Fig. 2. An arm 49 having a cam pin 50 projecting into groove 48 is pivoted on a stub shaft 51, projecting from frame 1, and the free end of said arm is provided with a slot 52 for engagement with a pin 53 projecting laterally from ejecting slide 36. A vertical guideway 54 is provided in portion 55 of frame 1 to permit of free vertical reciprocation of ejecting slide 36, and a slot 56 formed in said portion 55 furnishes clearance for pin 53 and also for the free end of contact portion 46 of spring 44 during movement of said slide in either direction.

It will be noted that a side wall 57 of hopper 21 and a downward extension 58 of pocket 20 coöperate with guideway 54 in furnishing an adequate guiding means for ejecting slide 36, and that a curved portion 59 at the juncture of said pocket and downward extension thereof serve as a deflector for contact spring 44 during the downward movement thereof, whereby said slide is permitted to move downward sufficiently to discharge a ring 5 from a nozzle 60.

In the manual operation of feeding folded strips of fabric 61' having pockets 62' therein for the reception of rings 5, the operator first places a pocket over the discharge nozzle 60, and then presses the pocket against a protuding portion 61 of said nozzle until a ring 5 is ejected into said pocket, whereupon the pocket is disengaged and the strip moved the width of a pocket down a gravity slide 62 arranged below frame 1, said slide having side walls 63 which assist the operator in guiding the pocket strip. Succeeding pockets are engaged with nozzle 60 in proper time to receive the intermittent discharge of rings 5.

It will be observed by reference to Figs. 9 and 10 that pockets 62' are formed by a longitudinal folding of a fabric strip 61' and by properly spaced transverse stitching 63' through the folded portions. The springs 5 are received with their axes disposed transversely of the pockets in order that the pocket walls may resist expansion, as shown in Fig. 9. After inclosing the springs by stitching an extension 64' of one fold over the free edge of the other, the pockets are so manipulated as to turn the springs around at 90 degrees for free expansion, as shown in Fig. 13.

The operation of the machine is as follows: Assuming that springs of the proper size are received intermittently by intermittent wheel 3 and discharged at the same rate into pocket 20, then plunger 31 and ejecting slide 36 will successively act on the springs for completing the operation. If, however, wheel 3 should receive springs too large for the fabric pockets, they will be caught between two downwardly converging walls 64 and 65 formed in hopper 21 directly above pocket 20, and thereupon be ejected through a circular opening 66 by the action of a plunger 67 provided exclusively for this purpose.

Plunger 67 is arranged vertically over plunger 31 and designed to operate synchronously therewith in a cylinder 68 formed integral with cylinder 32. These cylinders are supported at one end by a bracket 69 secured to frame 1, as shown in Fig. 1. Plunger 67 is provided with a head 70 similar to head 38 of plunger 31 and also with a tension spring 71 similar to spring 37 in cylinder 32. And in order to produce synchronism of movement of plungers 31 and 67, a connecting pin 72 and clearance slot 73 are provided between cylinders 32 and 68, as shown in Fig. 3.

While we have illustrated and described the preferred form of construction for carrying our invention into effect, there might be variations and modifications without departing from the spirit of our invention. We, therefore, desire to avail ourselves of such variations and modifications as come within the scope of the appended claims.

Having thus described our invention, what we claim as new and desire to secure by Letters Patent is:

1. A machine of the type described comprising in combination, a reciprocating means for compressing a coil spring in an axial direction, a guideway for retaining said spring, and an ejecting slide arranged to reciprocate in said guideway for radial action on said spring while in a compressed state.

2. In a device of the type described, a cylinder and a plunger operating therein, means for feeding coil springs intermittently into the path of said plunger so as to be in axial alinement therewith, a guideway against which said springs are successively compressed by said plunger, and a spring ejecting slide mounted to reciprocate in said guideway.

3. In a machine of the type described, an intermittent wheel having pockets in the periphery thereof, means for feeding coil springs into said pockets, a hopper for receiving springs from said wheel intermittently, a cylinder arranged in axial alinement with springs deposited in said hopper, a plunger operating in said cylinder for compressing springs axially in said hopper, a guideway against which said springs are compressed, and a spring-ejecting slide mounted to reciprocate in said guideway.

4. A machine of the type described comprising a cylinder and a plunger operating therein, intermittent means for feeding springs into the path of said plunger, and an ejecting slide mounted to reciprocate in a path at right angles to the axis of said cylinder and adapted to act radially on springs while in a compressed state.

5. A machine of the type described comprising in combination, a horizontal cylinder and a reciprocating plunger operating therein, a hopper comprising a spring pocket disposed in the path of said plunger, means for intermittently discharging coil springs into said pocket, a vertical guideway serving as an abutment for said springs while in a compressed state, and a spring ejecting slide mounted in said guideway for radial action on said springs.

6. A machine of the type described comprising in combination, a horizontal cylinder and a reciprocating plunger operating therein, mechanism coöperating with said plunger for moving the same in one direction and a spring for moving the same in the other, a hopper comprising a spring pocket arranged in the path of said plunger so as to retain springs co-axially with said plunger, intermittent means for feeding coil springs into said pocket, a vertical guideway having a wall against which springs contained in said pocket are successively forced by the action of said plunger, and a reciprocating ejecting slide mounted in said guideway for radial action on said springs.

7. A machine of the type described comprising a cylinder and a guideway arranged perpendicularly thereto, a plunger mounted for reciprocation in said cylinder, a spring retaining pocket arranged at one end of said cylinder and intermittent means for introducing coil springs thereto, the disposition of said pocket being such as to retain springs therein in axial alinement with said plunger, means on said plunger for engaging a spring in said pocket and compressing the same against a wall of said guideway, and an ejecting slide mounted for reciprocation in said guideway for radial action on said spring while compressed.

8. In a machine of the type described, the combination of an intermittent wheel having peripheral pockets therein mounted to rotate on a horizontal axis, means for feeding coil springs into said pockets, a spring hopper arranged in the plane of said wheel for receiving springs therefrom intermittently, a horizontal cylinder extending from one end of said hopper, a plunger operating in said cylinder and adapted to move into said hopper for successively compressing coil springs contained therein, a vertical guideway having a wall against which said springs are compressed, and an ejecting slide mounted for reciprocation in said guideway for radial action on said springs, said plunger being adapted to maintain a spring to be ejected in compressed condition during the initial movement of said ejecting slide.

9. A machine of the type described comprising an intermittent wheel having peripheral pockets therein for movement in a vertical plane, means for feeding coil springs into said pockets, a spring hopper arranged in the plane of said wheel and below the axis thereof for receiving coil springs intermittently from said wheel pockets, a pocket formed in the lower end of said hopper being semicylindrical in form, a cylinder extending from one end of said last named pocket and disposed co-axially therewith, a plunger mounted in said cylinder and operating means therefor, a head on said plunger for engaging a spring contained in said hopper pocket for longitudinal compression thereof, a vertical guideway having a wall serving as an abutment for a spring while compressed, and an ejecting slide mounted in said guideway, the action of said plunger head being such as to compress a spring fully within the path of said slide.

10. A machine of the type described comprising a substantially semicylindrical pocket and means for intermittently feeding coil springs thereto, a cylinder extending from one end of said pocket and arranged in axial alinement therewith, a reciprocating plunger operating in said cylinder and adapted to traverse the length of said pocket for compressing a coil spring therein, a guideway disposed perpendicularly to the axes of said cylinder and pocket and having a wall serving as an abutment for a compressed spring, and an ejecting slide mounted in said guideway for traversing said wall, the action of said plunger being such as to compress a spring within the limits of the path of said ejecting slide.

11. A machine of the type described comprising a substantially semicylindrical pocket for the reception of coil springs, intermittent means for feeding such springs into said pocket, a guideway arranged at one end of said pocket perpendicularly to the axis thereof, a cylinder extending from the other end of said pocket in axial alinement therewith, a plunger operating in said cylinder and having a head for engagement with a spring contained in said pocket for compressing the same against a wall of said guideway, and a spring ejecting slide mounted in the latter, the length of a compressed spring being less than the width of said guideway whereby free ejecting action therein is permitted.

12. In a machine of the type described a substantially semicylindrical pocket for the reception of coil springs, a rotary means for feeding coil springs into said pocket intermittently, a spring compressor arranged to compress a spring contained in said pocket longitudinally, and an ejecting means arrange for transverse action on a compressed spring.

13. A machine of the type described comprising a receptacle and means for feeding coil springs thereto intermittently, a guideway disposed at one end of said pocket and a reciprocating slide mounted therein, a compressor disposed at the other end of said pocket for compressing springs therein longitudinally into said guideway, and means for operating said slide in said guideway while a spring is compressed therein for ejecting the same.

14. A machine of the type described comprising an intermittent rotary conveyer and means for introducing coil springs into pockets provided in the periphery thereof, means for operating said conveyer, a substantially semicylindrical pocket arranged in the plane of said wheel for receiving springs therefrom, a spring compressor and operating means therefor for compressing springs contained in said pocket longitudinally, a guideway into which said springs are compressed and maintained in compressed condition by said compressor, an ejecting slide mounted in said guideway and operating means therefor, and a nozzle provided at the lower end of said guideway through which springs are ejected into pockets provided in folded strips when placed beneath said nozzle.

15. A machine of the type described comprising a spring compressor and a guideway disposed perpendicularly thereto, means for intermittently introducing coil springs in a space provided therefor between said compressor and guideway, said compressor being adapted to compress springs longitudinally into said guideway, means operating in said guideway for ejecting springs while in the compressed state, a nozzle provided at one end of said guideway through which said springs are ejected, and a gravity slide arranged below said nozzle for facilitating the feeding thereto of pockets formed in fabric strips.

16. A machine of the type described comprising a coil spring receptacle, means for intermittently feeding coil springs of a predetermined size to said receptacle, means for compressing springs in said receptacle, means for ejecting said springs while compressed, and means for ejecting over-size springs which may be fed to the machine before reaching said receptacle.

17. A machine of the kind described comprising a compressor cylinder and a plunger operating therein for compressing springs of a predetermined size, means for introducing such springs intermittently into the path of said plunger, means for ejecting said springs while compressed, and a second cylinder formed integral with said first named cylinder and a plunger operating therein in synchronism with said first named plunger for ejecting over-size springs.

18. A machine of the type described comprising an intermittent wheel conveyer having peripheral pockets therein, a hopper arranged in close proximity to said conveyer for discharging coil springs into the pockets thereof, a receptacle arranged in the plane of said conveyer for the reception of springs from said pockets intermittently, a spring compressor arranged at one end of said receptacle and having an axis parallel to the axis of said conveyer for compressing springs contained in said receptacle longitudinally, a guideway disposed in a plane parallel to the plane of said conveyer into which said springs are compressed, an ejecting means mounted in said guideway and adapted to act transversely on a spring while compressed therein, an ejecting nozzle provided at the lower end of said guideway through which springs are ejected into fabric pockets into which said nozzle is projected, a gravity slide arranged below said nozzle for facilitating the feeding of pockets to said nozzle, a shaft arranged parallel to the axis of said conveyer and operatively connected therewith, a cam mounted on said shaft, a connection between said cam and compressor for operating the latter, a second shaft arranged parallel to said conveyer axis, a box cam arranged at one end of said last named shaft, means interposed between said box cam and said conveyer for transmittting an intermittent movement thereto, a second box cam on the other end of said last named shaft, and means interposed between said last named box cam and said ejecting means for the control and operation thereof.

In witness whereof, we have hereunto set our hands and affixed our seals this 31st day of October A. D. 1919.

CHARLES C. MEUTSCH. [L. S.]
EMIL A. CHRISTOPH. [L. S.]